(12) United States Patent
Campbell (10) Patent No.: US 6,339,996 B1
(45) Date of Patent: Jan. 22, 2002

(54) NATURAL GAS COMPOSITION TRANSPORT SYSTEM AND METHOD

(75) Inventor: Steven Campbell, St. John's (CA)

(73) Assignee: Mr. Steven Campbell, St. John's (CA)

( * ) Notice: Subject to any disclaimer, the term of this patent is extended or adjusted under 35 U.S.C. 154(b) by 0 days.

(21) Appl. No.: 09/552,764

(22) Filed: Apr. 19, 2000

Related U.S. Application Data (60) Provisional application No. 60/129,878, filed on Apr. 19, 1999.

(51) Int. Cl.$^7$ ................................................ B63B 25/08
(52) U.S. Cl. ...................................... 114/74 R; 220/901
(58) Field of Search ........................... 114/74 R, 74 A, 114/74 T; 220/901

(56) References Cited

U.S. PATENT DOCUMENTS

| | | |
|---|---|---|
| 3,566,824 A | 3/1971 | Cuneo et al. |
| 3,690,550 A | 9/1972 | Hilberath et al. |
| 3,864,918 A * | 2/1975 | Lorenz ............................. 62/7 |
| 3,886,885 A * | 6/1975 | Becker et al. ............ 114/74 A |
| 4,336,763 A * | 6/1982 | Wolff ....................... 114/74 R |
| 5,803,005 A | 9/1998 | Stenning et al. .............. 114/72 |
| 5,839,383 A | 11/1998 | Stenning et al. .............. 114/72 |

FOREIGN PATENT DOCUMENTS

| | | |
|---|---|---|
| CA | 1073399 | 3/1980 |
| CA | 1169712 | 6/1984 |
| CA | 1187421 | 5/1985 |
| CA | 2198358 | 5/1997 |

\* cited by examiner

*Primary Examiner*—Jesus D. Sotelo
(74) *Attorney, Agent, or Firm*—Paul S. Sharpe; Marks & Clerk (57) ABSTRACT

A compressed natural gas (CNG) transportation system designed to operate at or just below ambient temperatures, that is either ship-based, truck-mounted, or modular for container transportation. The system is an alternative to LNG, pipeline, or conventional CNG transportation systems, where the foregoing modes of transportation are not practical or feasible. The use of composite pressure vessels provides a critical advantage over conventional CNG concepts that use steel or steel lined pressure vessels. The rupture characteristics of composite pressure vessels exceed those of conventional steel or steel lined pressure vessels. The substantial weight reduction of pressure-equivalent composite pressure vessels overcomes the weight-related problems associated with steel or steel lined pressure vessel concepts. The corrosion resistance of composite pressure vessels allows for the transportation of raw CNG and or compressed natural gas liquids (CNGL) which are most often corrosive. The use of composite vessels with corrosion resistant liners removes the requirement to process the gas and or liquids at or near the source of supply.

19 Claims, 7 Drawing Sheets

NATURAL GAS COMPOSITION TRANSPORT SYSTEM AND METHOD

This appln claims benefit of Prov. No. 60/129,878 filed Apr. 19, 1999.

FIELD OF THE INVENTION

The present invention relates to gas transportation, and more particularly, the present invention relates to a natural gas composition transport system and method.

BACKGROUND OF THE INVENTION

Currently, there are three basic means to transport natural gas or natural gas liquids (NGL).

The first and usually the most practical and feasible means of transporting natural gas and NGL, is a pipeline. Geographic obstacles are generally the only reasons that a pipeline is either not practical or feasible.

The second most common mode of natural gas transportation is liquified natural gas (LNG). Unfortunately, LNG has a high capital cost associated and requires a cryogenic liquefaction plant proximate the source, and a re-gasification plant at the discharge point. A liquefaction plant is generally very large and therefore, not practical or feasible for offshore gas production.

The third mode of transporting natural gas and liquids is by compression of the natural gas (CNG) and compressed natural gas liquids (CNGL). Unfortunately, conventional CNG concepts use steel or steel lined pressure vessels. This usually creates a weight problem as pressure vessel wall thickness is proportional to the design pressure. Steel pressure vessels are usually very heavy, especially when the design pressure is high.

At high pressures, the rupture characteristics of steel pressure vessels becomes a safety concern. In the event of a pressure vessel failure, the likelihood exists for other surrounding vessels to fail. Thus, the nesting of steel or steel lined pressure vessels is not a favourable option. As a concomitant disadvantage, without nesting the storage bottles together, economy of space is not maximized.

Further problems encountered by the use of steel or steel lined pressure vessels are corrosion and certification. To ensure that a minimum wall thickness is maintained, steel pressure vessels are typically x-rayed by use of radiography. This testing requires sufficient space to set up the necessary equipment. This, inherently, eliminates nesting as a possibility.

Several CNG ship-based pilot projects have been carried out in the past. Unfortunately, it was found that the weight of the steel pressure vessels required to make a potential project feasible was too heavy for the ships. The excessive weight created stability problems and water draft concerns. Also, servicing such a heavy ship would be impossible in any of the world's existing dry-docks. Exemplary of the prior art in this regard is U.S. Pat. No. 5,803,005, issued Sep. 8, 1998 to Stenning et al.

Currently, there are truck-mounted CNG projects in operation, but they are subsidized, since they would not be economically feasible on their own. The capacity of steel pressure vessels used for truck-mounted CNG systems is limited by a weight constraint of a truck transportation system. In addition, to store and transport raw gas and liquids, which most likely would be corrosive, requires a corrosion allowance. This further decreases the capacity, since the allowable operating pressure requires commensurate reduction.

There are communities that are currently tied-in to a natural gas pipeline which experience cyclic demands which the pipeline cannot handle. In such areas, there is a requirement to supply natural gas during peak load times. Unfortunately, current means of CNG transportation are not feasible due to highway weight restrictions, which in turn restricts the amount of natural gas that can be carried on a per trip basis.

Ethane would be an ideal hydrocarbon to use as an additive to meet the cyclic requirements of such areas. It can be transported as a liquid under relatively high pressure (700 psi) thus a significant quantity may be transported per trip. Under pipeline distribution pressure, ethane will exist as a vapor and therefore mix with the natural gas. As sales gas normally contains slightly less than 10% ethane, an incremental quantity will not adversely affect the consumers use of the gas. Nozzle tips would not require adjustment to account for the additional proportion of ethane. As a concomitant advantage, ethane has a higher heat value than the main constituent of natural gas, which is methane.

Generally speaking, there are communities that are not currently tied into a natural gas network because the demand that would exist there does not justify the cost of a pipeline to that community, especially during the transition phase, which may last a number of years. In these cases, liquefied ethane by pressurization may allow for the gradual growth of a distribution system to a point where the cost of a pipeline is justified. It may even be feasible to continue trucking ethane in larger quantities. Methane or a mixture of methane and ethane may also be used, if a feasible means of transporting methane can be obtained.

To obtain a practical and feasible means of transporting CNG and or CNGLs, a safe and relatively light-weight pressure vessel is required. This would elevate the excessive weight related problems that make current steel or steel lined pressure vessels inappropriate for CNG transportation over water or land. In addition, a pressure vessel that is resistive to corrosion would allow the transportation of raw natural gas and NGLs. This would enhance the feasibility of a gas production project, by eliminating the requirement to first process the gas and or liquids at the source.

In view of what has been proposed previously, there exists a need for an improved system for transporting natural gas and natural gas liquids discussed herein. The present invention satisfies this need.

SUMMARY OF THE INVENTION

One object of the present invention is to provide an improved system and method for transporting CNG and NGL.

The use of composite pressure vessels will overcome the safety, weight, and corrosion-related problems mentioned above.

Rupture characteristics of composite pressure vessels are much more favorable than that of steel or steel lined pressure vessels. Composite pressure vessels also have a broader temperature range without strength reduction than conventional steel or steel lined pressure vessels. Thus, the use of comparable composite pressure vessels increases the level of safety over conventional steel or steel lined pressure vessels.

Comparable composite pressure vessels are much lighter (as much as 70% less) than conventional pressure vessels that are made of steel or are steel lined. Thus, the use of composite pressure vessels will overcome the weight-related problems associated with using conventional steel or steel lined pressure vessels.

Composite pressure vessels with a non-metallic liner such as high density polyethylene (HDPE) will not corrode. Composite pressure vessels with a HDPE liner will therefore overcome the corrosion-related problems of storing raw natural gas and or raw NGLs in conventional steel or steel lined pressure vessels.

A further object of one embodiment of the present invention is to provide a light-weight, ship-based system for transporting raw, unprocessed, compressed natural gas and or compressed natural gas liquid, the system comprising:
- a ship;
- a plurality of composite material pressure vessels for containing raw, unprocessed, compressed natural gas and compressed natural gas liquid;
- connection means for interconnecting the vessels, the vessels being integrally connected to interchange pressurized gas and liquid from the vessels to user selected other vessels, whereby weight distribution in the ship may be adjusted.

The construction of composite pressure vessels varies from companies that manufacture them. The preferred model is constructed by wrapping an adhesive impregnated carbon fiber in a helical path around a HDPE liner. The ends of the pressure vessel would have an integral stainless steel boss to weld to external piping. This particular type of composite pressure vessel is known.

The transportation of gas and liquids together in multiple pressure vessels on a ship incurs a problem of its own as ballast on a ship is of a critical concern. If gas and liquids are loaded together, there may be an unfavorable distribution of weight incurred by the uneven distribution of liquids. Thus a system to transfer the liquids from certain or all composite pressure vessels, to specified pressure vessels, while under pressure, is required.

This problem may be overcome by orienting the composite pressure vessels vertically, so that the liquids will sit at the bottom. By connecting respectively the tops of the of pressure vessels to a gas manifold, and similarly connecting the bottoms of the pressure vessels to a liquid manifold, a slight pressure differential between the gas and liquids manifolds will facilitate a liquid/gas transfer. Thus, a desired weight distribution of the cargo may be obtained, and a stable and safe voyage may be conducted.

Similarly, a low center of gravity would be desired for a truck-mounted gas/liquids transportation system. This may also be obtained by orienting the composite pressure vessels vertically and connecting the tops together as well as all the bottoms respectively. An equalization of the liquids would be similarly obtained and the lowest possible center of gravity will prevail.

The transportation of liquefied ethane may include conventional refrigeration and insulation to ensure that a liquid state is maintained.

The invention relates to a compressed natural gas (CNG) and compressed natural gas liquid (CNGL) transportation system designed to operate at ambient temperatures. The CNG/CNGL transportation system may be either ship-based, truck-mounted, or modular, whereby composite pressure vessels are used to overcome the safety limitations, weight restrictions and corrosion problems, related with steel or steel lined pressure vessels.

In the ship-based CNG/CNGL transportation system, composite pressure vessels are oriented vertically and aligned in banks. Each bank of cells is encased in a frame that is removable for maintenance if required. A module is made up of two or more banks of cells. Within each compartment of the ship, two or more modules may exist.

A further object of one embodiment of the present invention is to provide a method of transporting raw, unprocessed, compressed natural gas and compressed natural gas liquid aboard a ship, comprising the steps of:
- providing a plurality of composite material pressure vessels for receiving gas or liquid within the ship;
- providing connection means for interconnecting the vessels;
- introducing the gas or liquid into the vessels; and
- selecting vessels for receiving gas or liquid to adjust weight distribution of the vessels within the ship for transporting the gas or liquid.

All of the cells in a bank are connected to a gas manifold at the top and a liquids manifold at the bottom. A control valve exists at the end of each manifold. Each bank in a module is connected together by an upper gas manifold and a lower liquids manifold. Each manifold is connected to the main gas and liquids manifold of the ship by an isolation and control valve.

The ship-based CNG/CNGL transportation system incorporates a ballast control system by the integral connection of the banks and modules. Liquids that have gravitated to the bottom of the cells may be moved to specified cells using pressure differentials within the module or a liquids pump on the main liquids manifold. By this means desired ballast 10 may be obtained.

The loading of a ship-based CNG/CNGL transportation system is performed in two phases. Phase one is the loading of the gas and liquids directly into the composite pressure vessels using the source delivery pressure. Phase two is the loading of the gas and liquids at elevated pressures. On-board compression is used to compress the gas to this elevated pressure. During phase two, the oncoming liquids are removed with the assistance of deck mounted liquid slug catcher. The liquids are then pumped into designated cells to achieve the desired ballast.

Upon arriving at the unloading terminal, the gas and liquids may be unloaded separately but concurrently to minimize delivery time.

To maintain a constant and high discharge pressure, on-board compression is used to unload the modules in a combined and sequential order.

To increase capacity and efficiency, refrigeration and insulation may be used.

In order to maintain continuous production, several shuttle tankers may be required.

A truck-mounted CNG/CNGL transportation system will also have the pressure vessels mounted vertically. This will allow for the lowest center of gravity possible in the presence of any liquids. Similarly, the truck-mounted system has an upper gas manifold and a lower liquids manifold, connecting the banks of pressure vessels. At the end of each manifold exists an isolation and control valve.

The truck-trailer is designed and constructed to combine the trailer body and the support frame for the pressure vessels. This allows for a high strength trailer body, using minimal materials, translating into a light-weight transportation system.

A modular CNG/CNGL transportation system is similar in that the composite pressure vessels are vertically oriented and are integrally connected by an upper gas manifold and a lower liquids manifold. The pressure vessels are nested and the support frame is designed and constructed integral with the modular container frame.

The transportation of liquefied ethane by the above described means may include conventional refrigeration and insulation to insure that a liquid state is maintained.

BRIEF DESCRIPTION OF THE DRAWINGS

Similar numerals in the figures denote similar elements.

DETAILED DESCRIPTION OF THE PREFERRED EMBODIMENTS

Referring to FIGS. 1 through 6, the preferred embodiment is a ship-based CNG/CNGL transportation system that uses composite pressure vessels to achieve a safe, lightweight, ballast controlled, and corrosive resistant storage and transportation system, designed to operate at ambient temperatures.

Figure 1:
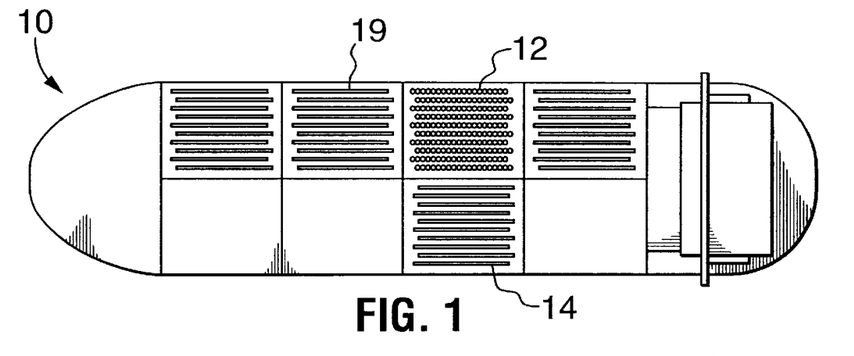
FIG. 1 is a plan view of shuttle tanker showing compartments and banks of cells.
Figure 2:
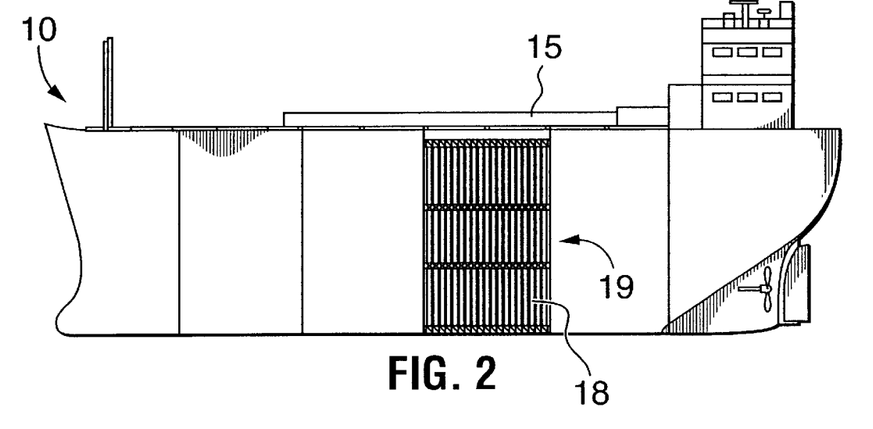
FIG. 2 is an elevational view of shuttle tanker.
Figure 5:
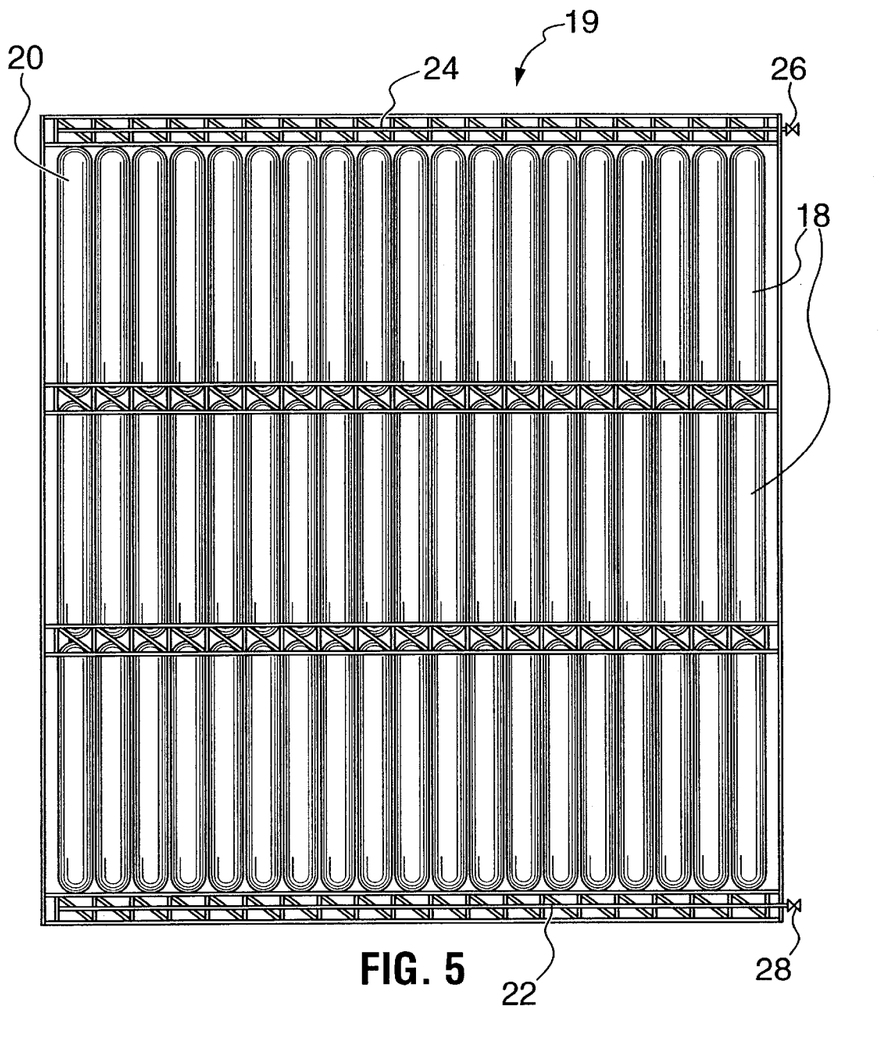
FIG. 5 is an elevational view of a typical frame containing a bank of cells.

As a first example, the vehicle may comprise a shuttle tanker 10 divided into two sides 12 and 14, each with an equal number of compartments. Each compartment may contain one or more modules 16. Within each module 16, there would be contained numerous banks of composite pressure vessel cells. Each bank of cells is arranged in line, with two or more pressure vessels 18 stacked and connected vertically to efficiently use the available height within the compartment. Each bank is supported in a metal frame 20 secured within the compartment. The frames 20 are constructed so that banks of cells may be installed or removed without disturbing other banks within the compartment. The frames 20 run aft to bow and are offset side by side, resulting in the nesting of the pressure vessels 18. This maximizes the number of pressure vessels 18 that can be contained within each containment area of the shuttle tanker 10.

Figure 3:
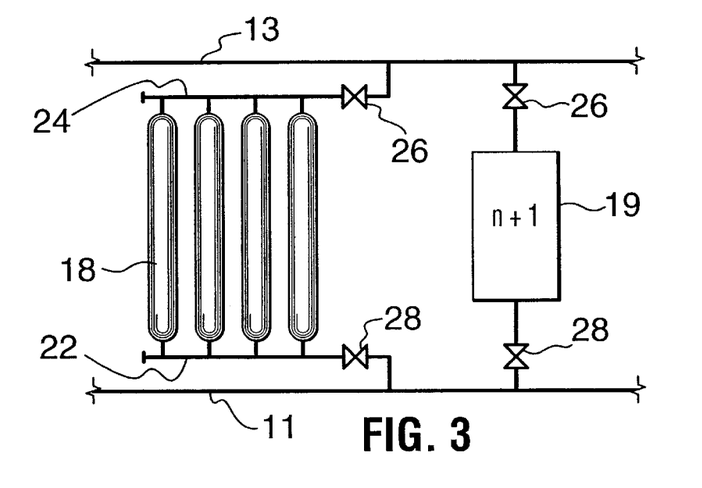
FIG. 3 is a schematic illustration of a typical bank of cells.
Figure 4:
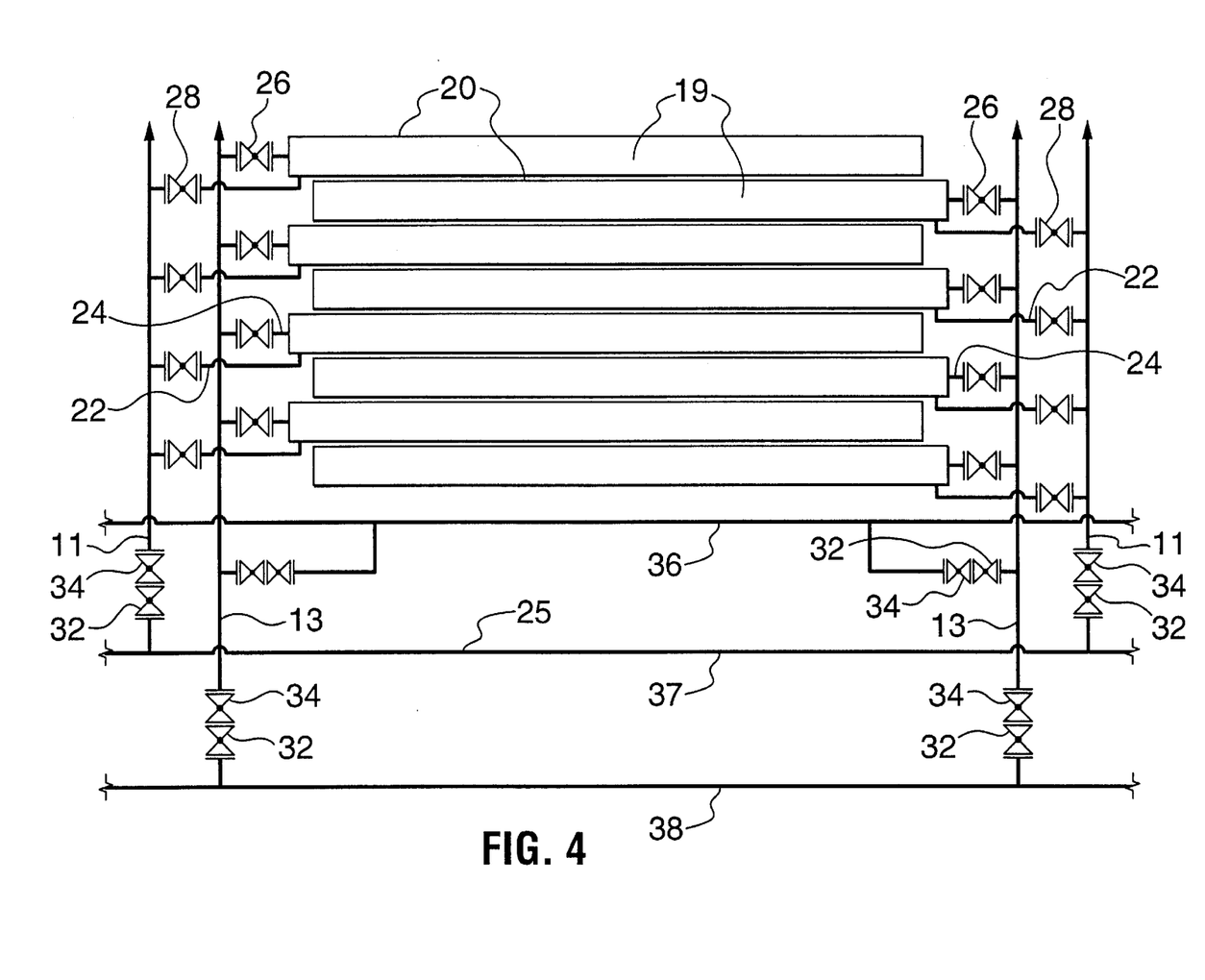
FIG. 4 is a schematic illustration of a typical compartment with multiple modules.

Each bank of cells 19 is equipped with an upper gas manifold 24 that connects the tops of the pressure vessels 18 within each bank, and respectively, a lower liquid manifold 22 that connects the bottoms of the pressure vessels 18 within each bank 19. At the end of each respective manifold exists a control valve 26,28. Each control valve is connected to a respective liquid 11 and gas manifold 13 that connects one or more banks to form a module 16. Each module 16 is then respectively connected to the main liquid and gas manifold for that side of the ship 10, through a block valve 32 and control valve 34. The upper gas manifold 13 of each module 16 is also connected to a loading and discharging manifold through a similar block valve and control valve.

Figure 6:
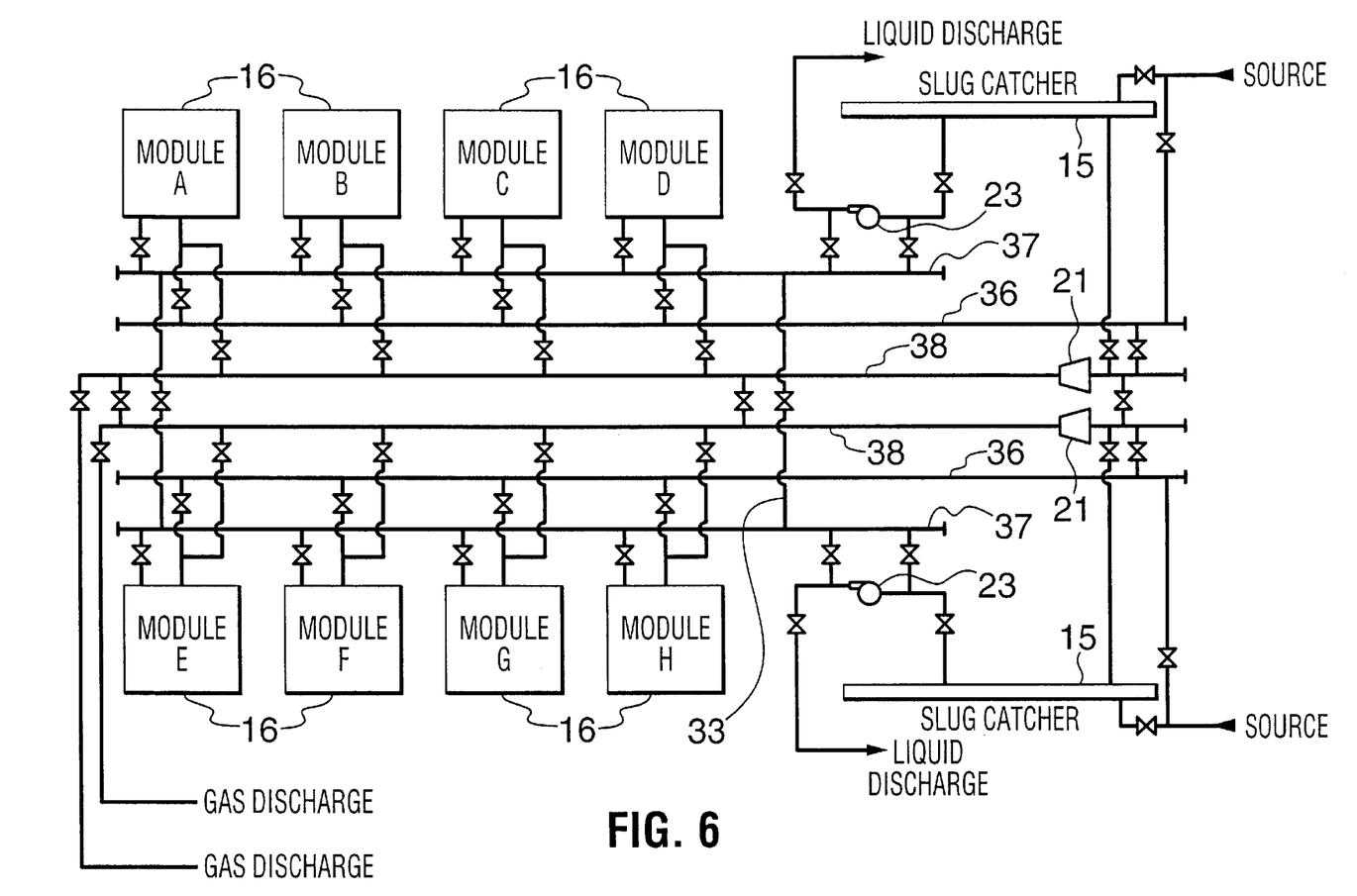
FIG. 6 is a schematic illustration of a general arrangement of modules, equipment and piping on shuttle tanker.

Banks of cells 19 are oriented aft to bow to assist the ballast control system by the transfer of liquids to the outermost or desired bank of the respective compartment. To do this, all banks in a compartment excluding the specified one to contain the liquids, are filled from the loading manifold at the source delivery pressure. Once the pressure vessels of a module 16 are pressurized to this pressure with a gas and liquids mixture, the top control valve on each bank of cells in the module 16 is closed. The bottom control valves of the same banks of cells are then opened, pressurizing the module's liquids manifold 11 with compressed natural gas liquid. The bottom control valve on the desired bank of cells to be filled is then eased open allowing the pressure differential to transfer the liquids to the desired bank of cells. When pressure equalization is about to occur, the control valve on the now liquids bank of cells is closed. The compressed gas remaining in the top of the liquids bank of cells may then be bled off by partially opening the control valve on the gas manifold 13. This gas is then dumped into non pressurized cells via the ship's low pressure gas manifold 36 or directed to the on board compressor 21 for that side of the shuttle tanker and recompressed into the high pressure loading manifold 38 for that side.

As slugs of liquids may be prevalent during phase one of the loading process, one designated bank of cells within a compartment may not be sufficient. If it is found that there are more liquids in a compartment than can be contained in a single bank of designated cells, a second bank of cells may be used for liquid storage. To move the remaining liquids to that bank of cells, a pressure differential is used. This would be obtained by opening the liquids control valves on all banks to have liquids moved from or to within a module 16, and then partially opening the gas manifold on the top of the liquids designated bank of cells. The gas will flow into the ship's low pressure gas manifold 36, lowering the pressure in that bank of cells. The liquids will then transfer into that bank of cells by the pressure differential. If desired, the excess liquids may be transferred to another module through the main liquids manifold 37 using similar pressure differentials.

When nearly all of the modules have been pressurized to the source delivery pressure, typically 500 to 2,000 psi, on-board compressors 21 are then used to increase the pressure in the loading manifolds, typically 2,000 to 3,000 psi. The modules are then filled in a manner that efficiently uses the compressors.

As liquids cannot be compressed, they must be removed before the gas is compressed during phase two of the loading process. A slug catcher 15 fixed to the deck of the shuttle tanker 10 is used to catch the bulk of the liquids. The liquids caught in the slug catcher 15 are then pumped into designated liquids banks through the liquids manifold 37. The respective compressors 21 would also be equipped with scrubbers (not shown) (common oilfield practice) to remove remaining free liquids. The liquids from the scrubbers would then be tied into the liquids pump 23.

Once the ship 10 has been fully loaded, ballast control may be continued further. This may be achieved by moving the liquids using the liquids pump 23 and or pressure differentials through the gas and liquids manifolds, similarly as described above.

Upon arriving at the discharge location, the liquids may be discharged separately but concurrent to the gas since the liquids manifold 37 would be independent of the gas unloading process.

During the off loading of the gas, it is most likely that a relatively constant discharge pressure would be required. For safety, it is desirable to unload one module 16 at a time. A control valve on each module 16 is progressively opened to maintain the desired discharge pressure. As the pressure declines, the control valve is fully opened. As the discharge pressure declines towards the minimum acceptable, the onboard compressor 21 is used to maintain the discharge pressure. The compressor would draw from the previous module that was discharging until the suction pressure reaches a minimum allowable pressure. A new module is then opened for direct discharge and the one that was directly discharging is turned into a compressor suction source.

Refrigeration and insulation may be used to increase the efficiency and capacity of the storage system if deemed feasible and necessary.

For additional safety, the shuttle tanker's compartments may be filled with an inert gas, replacing oxygenated air. Each bank of cells is also equipped with an emergency relief valve that's tied into a flare boom.

Common oilfield practices would be implemented to reduce corrosion and overcome other common problems experienced in the transfer and storage of natural gas and natural gas liquids.

In order to maintain continuous production, several shuttle tankers may be required. The number and size of these shuttle tankers, as well as the number and pressure capacity of the pressure vessels, will be determined by optimization considering such criteria as, production requirements, unloading facilities (rate and volume capacity), and cost.

Figure 7:
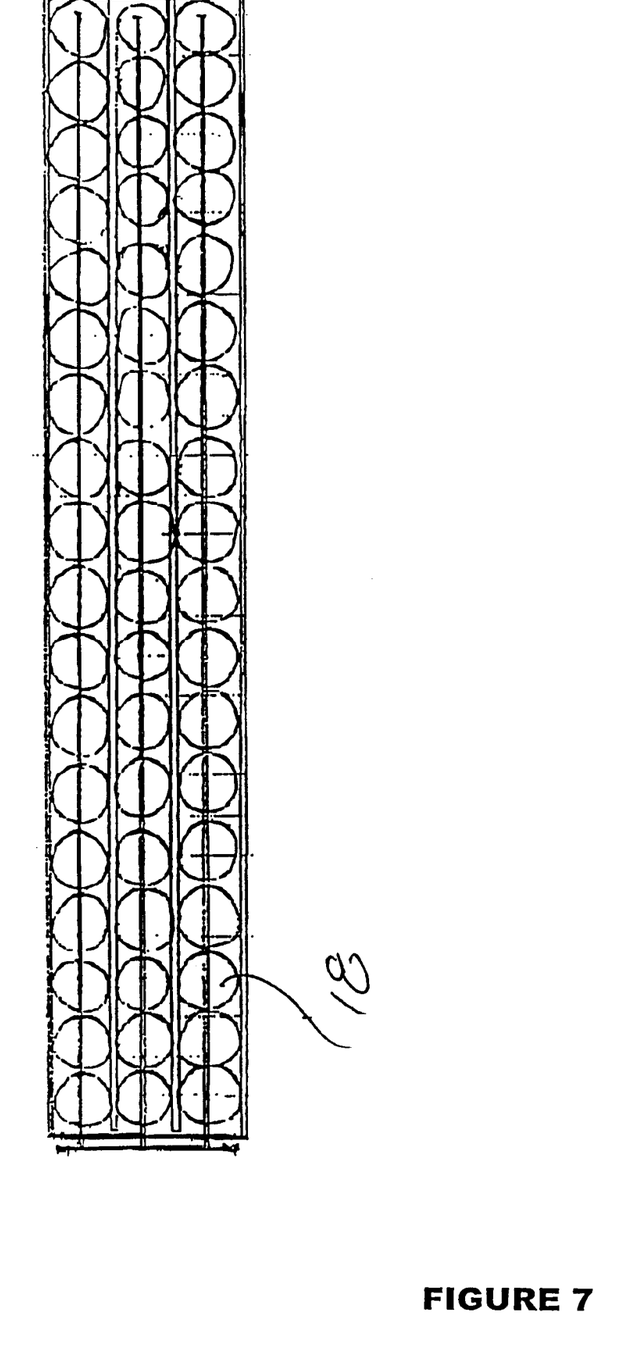
FIG. 7 is a plan view of truck-mounted CNG/CNGL transportation system.
Figure 8:
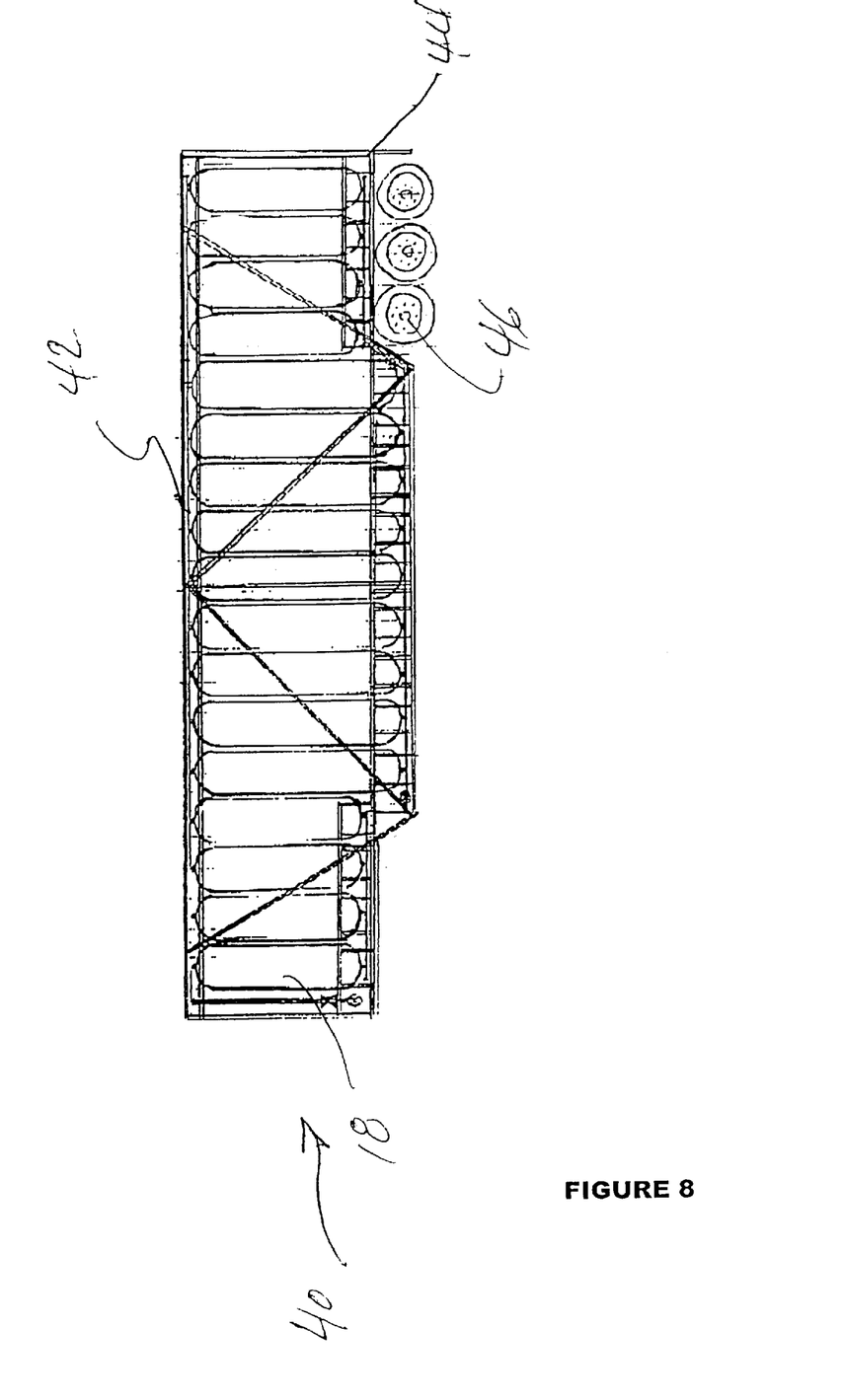
FIG. 8 is an elevational view of truck-mounted CNG/CNGL transportation system.
Figure 9:
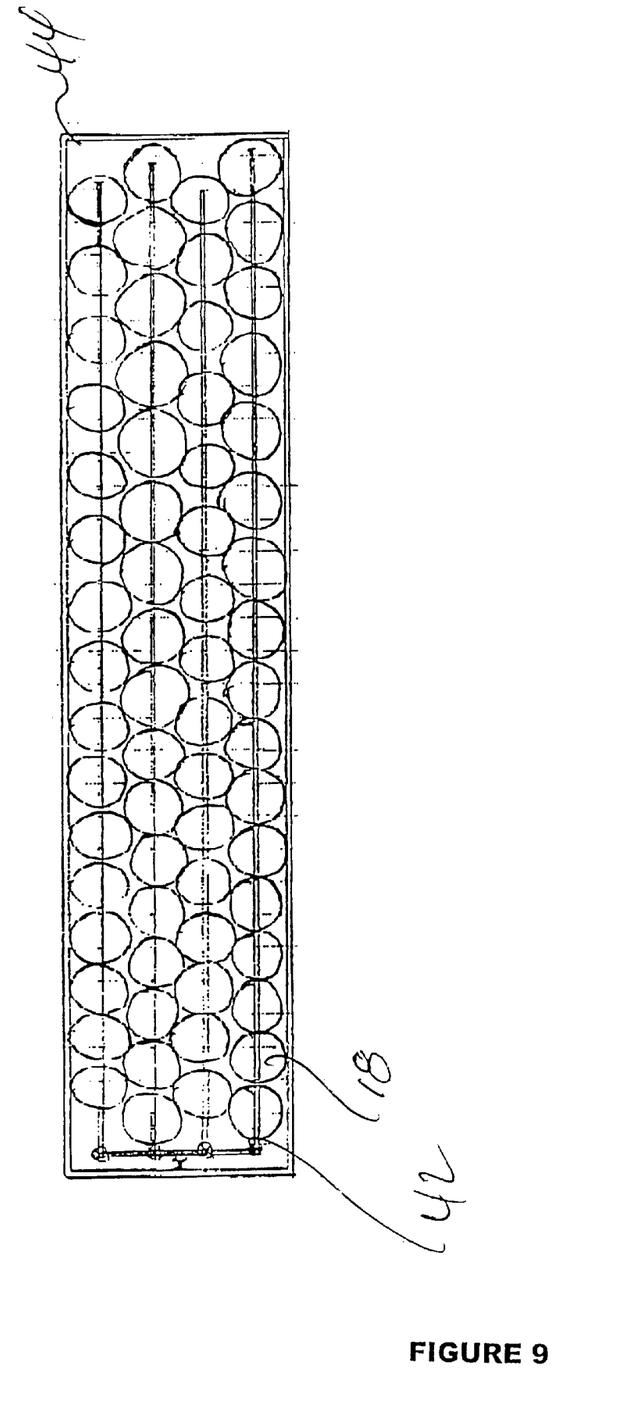
FIG. 9 is a plan view of modular CNG/CNGL transportation system.

As shown in FIG. 7 through FIG. 9, a truck-mounted CNG/CNGL transportation system uses vertically oriented composite pressure vessels 18. Similarly, the tops of the pressure vessels are connected to a top manifold and respectively the bottoms of the pressure vessels are connected to a liquids manifold. There may be one or more banks of cells compiling the total capacity of the truck-mounted system. Similarly, each bank of cells will have a control valve. A module of banks will be equipped with a block valve and a control valve. A truck-mounted system, generally denoted by numeral 40, may also have a small compressor (not shown) for top up and discharge assistance.

To allow for a low center of gravity, the truck-mounted system 40 has the pressure vessels 18 supported in a frame 42 that is integral with the trailer body 44. Thus, the bottom of the pressure vessels may sit at or near axle elevation, denoted by numeral 46. Any liquids will, therefore, sit at a low elevation and create a low center of gravity. By aligning the banks of pressure vessels in line with trailer 44, weight shifting (sloshing) of liquids is eliminated. Weight shifting of liquids is a common cause of tanker trucks overturning on turns.

To mount the pressure vessels 18 vertically, the frame 42 and combined trailer body 44 is designed to have a large moment arm (depth). This will allow for a very strong trailer body 44 requiring minimal materials, resulting in a light-weight trailer body 44.

For modular or containerization of CNG and or CNGL, the composite pressure vessels would also be nested vertically with all cells being integrally connected to an upper and lower manifold respectfully. This will allow for the discharge of liquids separately or simultaneously with the gas. Similar to the truck CNG transportation system, the support frame of the pressure vessels would be designed and constructed integral with the container body.

The transportation of liquefied ethane by one of the above described means, may include the use of conventional refrigeration and insulation to insure that a liquid state is maintained.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A light-weight, ship-based system for transporting raw, unprocessed, compressed natural gas and or compressed natural gas liquid, said system comprising:
    a ship;
    a plurality of composite material pressure vessels for containing said raw, unprocessed, compressed natural gas and said compressed natural gas liquid;
    connection means for interconnecting said vessels, said vessels being integrally connected to interchange pressurized gas and liquid from said vessels to user selected other vessels, whereby weight distribution in said ship may be adjusted.

2. The system as set forth in claim 1, wherein said composite pressure vessels are aligned vertically in groups coaxial with the length of said ship, each said group comprising:
    a lower liquids manifold means connecting bottom sections of each vessel, said manifold means terminating at a liquids isolation valve; and
    upper gas manifolds connecting top sections of each vessel, terminating at a gas isolation valve.

3. The system as set forth in claim 2, comprising:
    at least two groups of vessels;
    a liquids sub-manifold connecting each said liquids manifold at said isolation valves of each of said groups within a module and terminating at a module isolation valve; and
    a gas sub-manifold connecting all gas manifolds at said isolation valves of each group within a module, and terminating at a module isolation valve.

4. The system as set forth in claim 3, said system including a loading and unloading manifold, whereby gas loading or liquid loading is achieved through said loading and unloading manifold connected to each said module at said gas isolation valve for loading and unloading gas or liquid.

5. The system as set forth in claim 3, including a main liquids manifold connected to each said module at said liquids isolation valve for loading of segregated liquids or unloading of liquids.

6. The system as set forth in claim 3, whereby said ship is divided into two trains.

7. The system as set forth in claim 1, further including:
    at least one slug catcher for removing liquids before compression;
    at least one liquid pump for pumping said liquid to required pressures for loading or unloading said liquids.

8. A method of transporting raw, unprocessed, compressed natural gas and compressed natural gas liquid aboard a ship, comprising the steps of:
    providing a plurality of composite material pressure vessels for receiving said gas or liquid within said ship;
    providing connection means for interconnecting said vessels;
    introducing said gas or liquid into said vessels; and
    selecting vessels for receiving said gas or liquid to adjust weight distribution of said vessels within said ship for transporting said gas or liquid.

9. The method as set forth in claim 8, wherein said vessels are loaded in a two phase operation.

10. The method as set forth in claim 9, wherein said two phase operation includes, in a first phase, loading said vessels at a delivery pressure of a source of said gas or compressed natural gas liquid.

11. The method as set forth in claim 10, wherein said two phase operation includes, in a second phase, compressing, at an elevated pressure relative to said delivery pressure, said gas or compressed natural gas liquid on board said ship.

12. The method as set forth in claim 10, including using on board compression to elevate pressure during said second phase of said loading and maintaining maximum unloading pressure during unloading.

13. The method as set forth in claim 10, wherein stored liquid may be unloaded separately and concurrently through main liquid manifolds and liquid pumps.

14. The method as set forth in claim 10, further including the step of positioning said composite vessels vertically.

15. The method as set forth in claim 8, further including transferring said liquid or gas from one vessel to another by pressure differentials.

16. A light-weight vehicle based system for transporting raw, unprocessed, compressed natural gas or compressed natural gas liquid, said system comprising:
    a vehicle;
    a plurality of composite material pressure vessels for containing said raw, unprocessed, compressed natural gas and said compressed natural gas liquid;
    connection means for interconnecting said vessels, said vessels being vertically aligned and integrally connected to obtain a low center of gravity.

17. The method as set forth in claim 16, wherein said vessels are aligned vertically in rows running the length of said vehicle.

18. The method as set forth in claim 17, said system including a top gas manifold and a bottom liquid manifold for loading gas or liquid separately and concurrently.

19. The method as set forth in claim 16, wherein said vessels are oriented vertically and connected to said gas manifold at a top of said vessels and a liquid manifold at the bottom of said vessels.

* * * * *

UNITED STATES PATENT AND TRADEMARK OFFICE
CERTIFICATE OF CORRECTION

PATENT NO. : 6,339,996 B1
DATED : January 22, 2002
INVENTOR(S) : Campbell

It is certified that error appears in the above-identified patent and that said Letters Patent is hereby corrected as shown below:

Drawings,
Delete drawing sheet(s) 5-7, and substitute therefore the drawing sheet(s) consisting of Fig(s) 5-7 as shown on the attached pages.

Signed and Sealed this

Sixth Day of August, 2002

Attest:

Attesting Officer

JAMES E. ROGAN
Director of the United States Patent and Trademark Office